Patented June 16, 1931

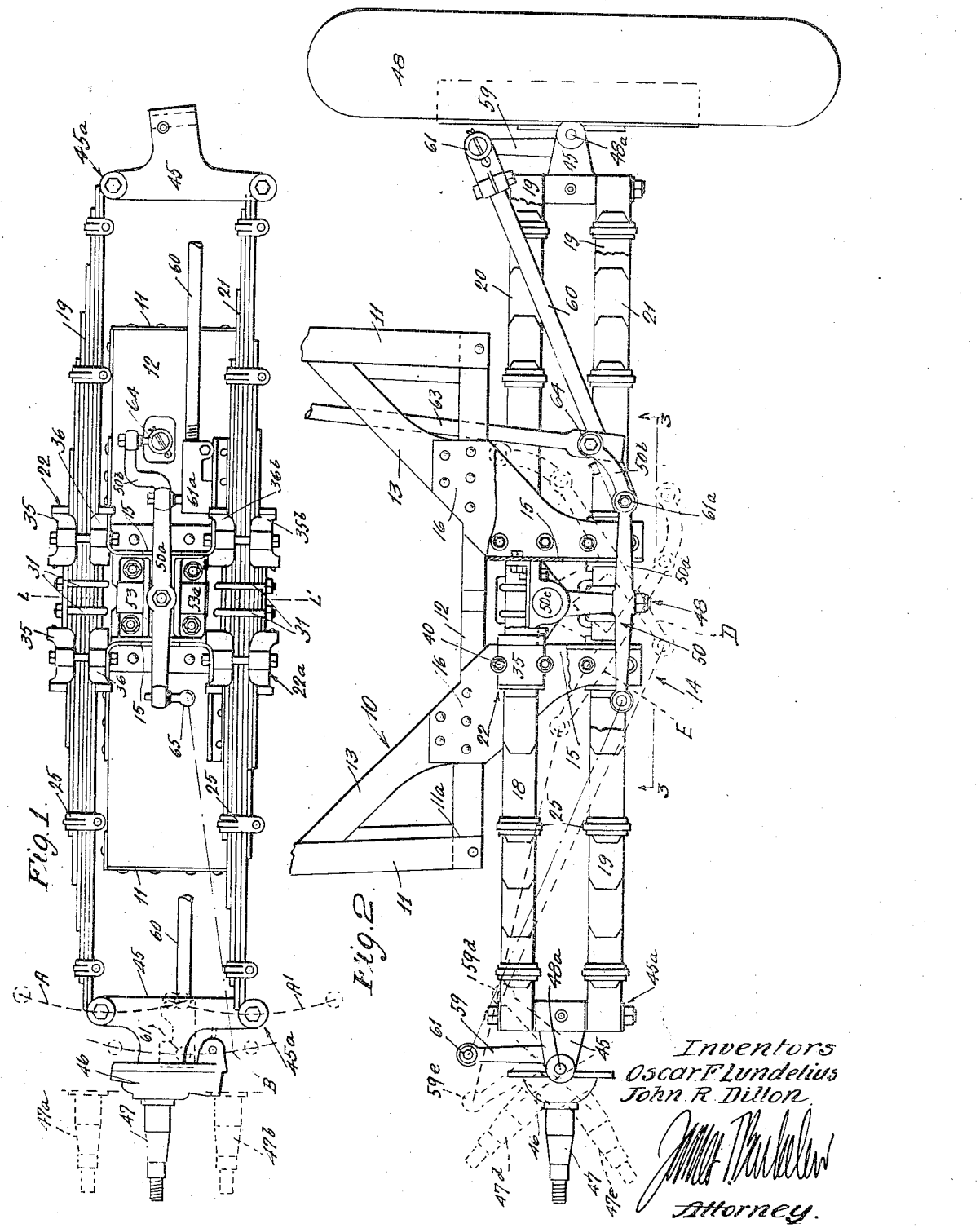

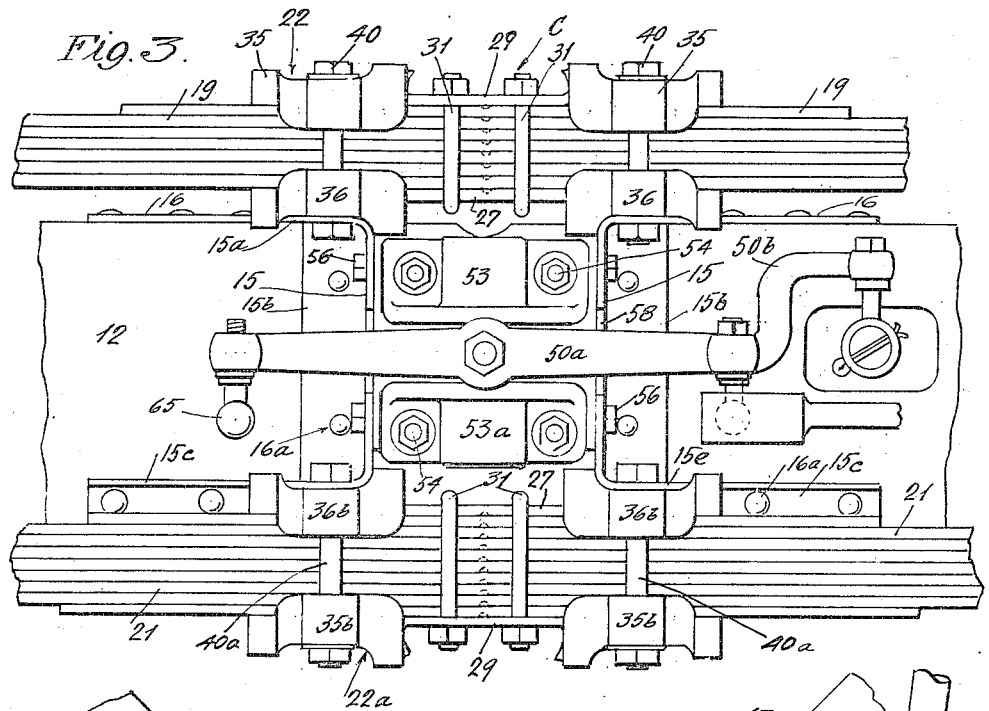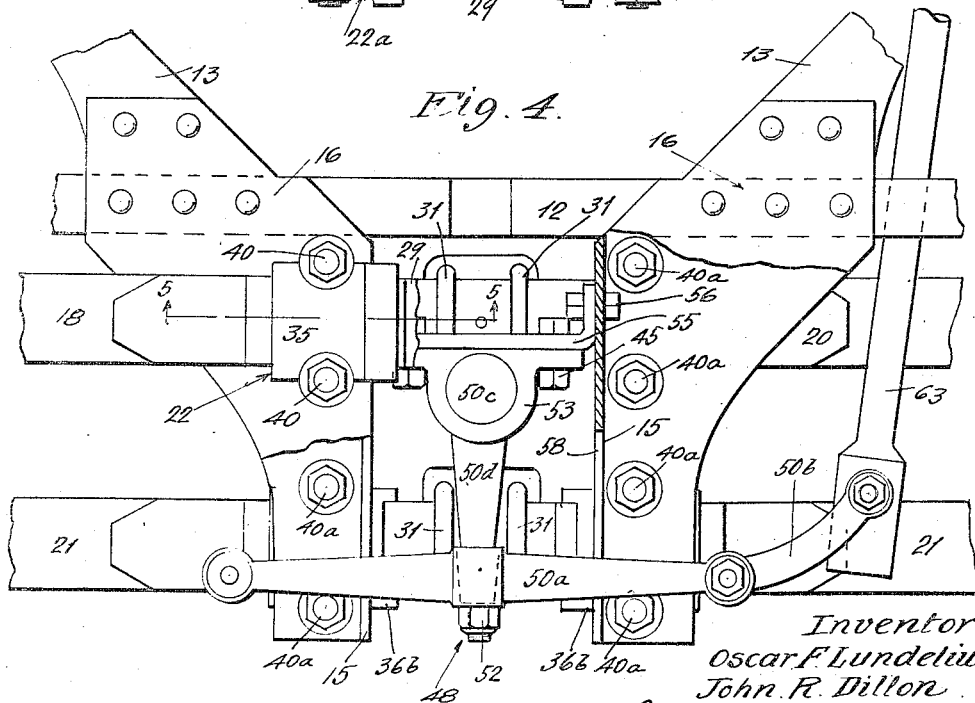

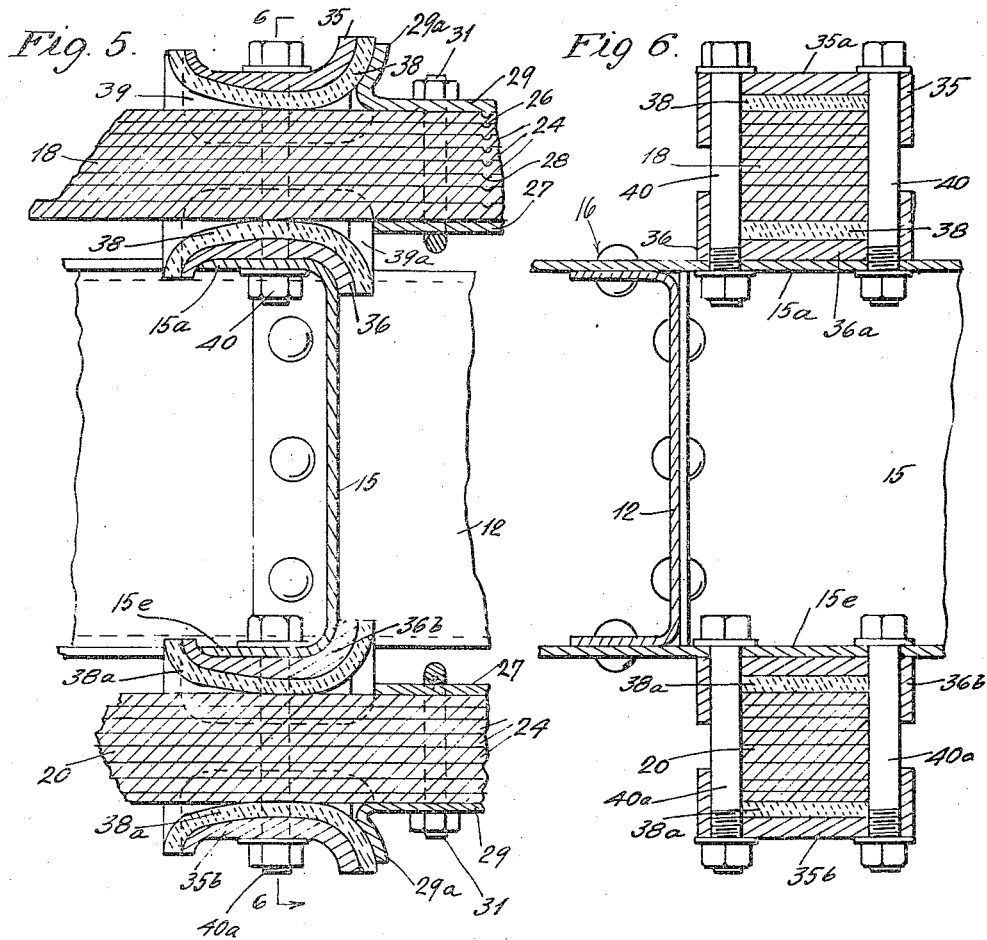

1,810,319

UNITED STATES PATENT OFFICE

OSCAR F. LUNDELIUS AND JOHN R. DILLON, OF LOS ANGELES, CALIFORNIA, ASSIGNORS TO LUNDELIUS & ECCLESTON MOTORS CORPORATION, OF LAS VEGAS, NEVADA, A CORPORATION OF DELAWARE

SPRING MOUNTING

Application filed January 9, 1929. Serial No. 331,230.

This invention has to do generally with vehicular spring mountings, and relates particularly to mountings for use in spring suspension systems wherein the vehicle body is mounted on the wheels through spring systems rather than by connection with rigid axles.

The spring mounting embodied in the invention is designed with the primary purpose of assuring maximum flexure and free action of springs to which the mounting is applied. It is readily apparent that the usual vehicle leaf spring, in order to be capable of flexure to its greatest extent, should, theoretically speaking, be mounted at its exact longitudinal center, thereby providing maximum lengths of spring on each side of the central mounting. Inasmuch as a sufficiently rigid connection of this nature, and one which will withstand torsional strains, cannot be made practically, the spring is usually mounted at two points equally spaced on either side of the spring center. Should the spring be clamped at these points, it is evident that the effective spring lengths are reduced, and in some cases substantially by the distance from the center of the spring to the point of mounting.

Although the invention contemplates mounting the spring at longitudinally spaced points thereon, the characteristics of the individual mountings at these points are such that free action of the spring is entirely unrestricted by the mountings, and the effect had is practically that which would result from mounting the spring at its center. A generally similar spring action is had by the use of the mounting described in a co-pending application on spring mounting by Oscar F. Lundelius, filed Dec. 13, 1926, Ser. No. 154,382, the mountings in that invention embodying metallic boxes shaped in a manner such as to enable unrestricted spring action in one direction and to produce a snubbing action upon spring flexure in an opposite direction. In the present type of mounting, the springs, instead of being held between metallic parts, are confined at their top and bottom faces, between cushions of compressible or yieldable material such as rubber, which gives to the springs the utmost freedom of action, and to an extent which is believed to be even greater than that obtainable by the use of a metallic mounting.

It will be understood that the invention may be applied to spring mountings in general, irrespective of the number and arrangement of the springs, but for the purpose of illustrating a preferred application of the present mounting, we have shown it to be adapted for use in a spring suspension system wherein, as stated above, the connections between the vehicle body and wheels are made directly through springs instead of the usual method of connection through rigid axles. Spring systems of this general type are also described in a patent issued to Oscar F. Lundelius on May 16, 1926, No. 1,576,920, on spring mounting, and also in the copending application referred to hereinabove.

The invention also includes, in addition to the mountings directly associated with the springs, a supporting structure connecting the individual mountings with the vehicle frame, said structure being also employed for the purpose of carrying parts of the steering gear.

Numerous additional features and advantages of the invention will be most readily and clearly understood from the following detailed description, reference being had to the accompanying drawings, in which:

Figure 1 is an elevational view of the forward end of a vehicle frame to which an embodiment of my invention has been applied;

Fig. 2 is a plan view of the forward end of the vehicle; parts being broken away to clearly illustrate the construction;

Fig. 3 is an enlarged fragmentary view taken on line 3—3 of Fig. 2;

Fig. 4 is a plan view of Fig. 3; certain parts being broken away as in Fig. 2;

Fig. 5 is an enlarged section on line 5—5 of Fig. 4; and

Fig. 6 is a section on line 6—6 of Fig. 5.

It is to be clearly understood that although we have shown the several springs to be arranged with certain symmetry, the present invention is in no way limited to such symmetrical arrangement, and that certain features of the invention are applicable to a system embodying a lesser number of springs in each unit. In addition, certain features may be embodied in the mounting of a single spring. Therefore, except for such claims as definitely set forth a predetermined number or arrangement of the individual springs, the claims are to be considered unlimited as regards the number or relative arrangement of springs.

The general nature of the mounting is such that it may be applied with equal advantage either to the front or rear suspension of the vehicle, and although certain detailed features of construction may vary, particularly with regard to the supporting structure, the general principles of the mounting are the same. For this reason, we have illustrated the mounting as applied to the front suspension only, as the modifications necessary to equip the rear suspension will be readily apparent to those skilled in the art.

Referring first to Figs. 1 and 2, the vehicle frame, generally indicated at 10, is seen to include channel side rails 11, channel end rail 12 and the diagonal braces 13. The spring supporting structure is indicated at 14, this structure embodying a pair of channel-shaped arms 15, the upper portions or flanges 15a of which overlap and are riveted at 16 to the diagonal braces and front channel rail of the frame. The channel arms are shaped to provide flanges 15b and 15c which are also riveted to the front end rail 12 at 16a. It will be seen that the frame is strengthened against longitudinal thrust imparted thereto through the supporting structure, by means of the braces 13, thus relieving the end rail and also the corner joints 11a between the side and end rails.

The spring suspension unit embodies four springs 18, 19, 20 and 21 which, together with perches or supports 22 and 22a, are symmetrically arranged about substantially vertical and horizontal axial planes, whereby the stresses and strains arising from road shocks, traction, etc., are uniformly distributed through the spring suspension system rather than being concentrated on any one or less than the entire number of springs or mountings, to obvious advantage. However, this showing of a definite number of springs and the symmetrical arrangement thereof, is in no way to be considered as limitative on the invention, for it will be readily apparent that a lesser number of springs may be provided, or that the spring arrangement may differ from that shown without departing from the spirit and scope of the broader claims.

The springs are made up in the usual manner of leaves 24 held together by fastenings 25, and the leaves are prevented from relative longitudinal slippage by means of the interfitting nibs 26 and recesses 28 formed in the springs at their center point. The springs are also clamped at their centers by means of clamps C and are held against bodily lateral movement by means of plates 27, substantially the width of the springs, and the opposing buffer plates 29, these plates being held in pairs to bear against opposite sides of the springs, by U-bolts 31 which extend around the springs and plates 27 and through the buffer plates 29. It will be noted that the upturned ends 29a of the buffer plates are curved to conform to the shape of rubber pads 38, and to bear against these pads to prevent lateral movement of the individual springs. Upon appreciable spring flexure, the buffer plates are subjected to a certain amount of vertical movement, and should these plates extend flatly along the springs to bear against the pads, the latter would be subjected to destructive wear. However, by shaping the buffer plates as described, the curved portions 29a mainly slide along and more or less compress the pads without causing the latter appreciable wear, and without binding between these parts. Thus it will be seen that although the buffer plates serve to prevent lateral movement of the springs, they do not, in any way, restrict the normal flexure of the springs.

The springs are mounted on the supporting arms by means of the spaced and axially alined perches 22 adapted to take the spring at two longitudinally spaced points therealong, the springs being confined within the individual mountings 22 in such a manner that their action is substantially unrestricted by the mountings. The various perches are identical in construction and similar as regards their mounting, except that those supporting the upper springs 18 and 19 are carried on the upper flanges 15a of the supporting arms whereas the perches for the lower springs 20 and 21 are joined to the arm flanges 15e. The upper perches each embody a pair of channel shaped blocks 35 and 36 placed in opposing positions on top and beneath the springs respectively. It will be noted in Fig. 6 that the blocks, in cross section, define substantially rectangular openings to receive the spring. The sides 35a and 36a, however, as viewed in longitudinal section (see Fig. 5) are curved from their center away from the springs, the advantages of which will appear later. Pads 38, of suitable yielding and elastic material, for instance a pure grade of rubber, are confined between blocks 35 and 36 and the springs, the shape of the pad conforming to that of sides 35a and 36a of the blocks. The pads thus form resilient or yielding facings for the block and may be broadly considered as parts of the blocks. Thus the pads are spaced at 39 and 39a from the spring on each side of their central points of contact therewith. The individual perches are mounted on the supporting arms 15, and blocks 35 and 36 drawn together to more or less compress the pads 38 against the springs by means of bolts 40 extending through the blocks on opposite sides of the spring and through the upper flanges 15a of the arms. It may be stated at this point that it is within the scope of the invention to dispense with blocks 36 and thus permit the pads to rest directly on the supporting arms, or in other words, the lower block may be integral with the supporting arm, but in order to give to the pads the shape desired on the surfaces bearing against the spring, it is found preferable to rest the pads on the specially shaped blocks. The lower perch structure is identical, the rubber pads 38a being confined against the springs between blocks 35b and 36b, and the assemblies joined to the lower flanges 15e of the arm by means of bolts 40a. It may be stated that although the illustrated shape of pads 38 and 38a is preferred, it may, in some instances, be desirable to modify their shape to the extent that the pads may bear flatly against the springs.

It will be apparent that in effect, the springs have substantially pivotal mounting in the various perches and therefore the springs may flex in either direction with complete freedom. This being the case, the action obtained is substantially that which would result from mounting the springs at a single point on the center line L—L although they may have slight vertical movement at their centers upon considerable flexure. An additional advantage is had by the use of yieldable pads instead of metallic spring engaging parts in that binding cannot possibly occur, and also due to the fact that the pads in themselves contribute considerable spring action upon vertical movement of the spring within the mountings.

In the present preferred type of suspension system, the springs are terminally and pivotally connected at 45a to the wheel carriers 45 and these, in turn, carry the steering knuckles 46 and wheel spindles 47. As road irregularities are encountered by the wheels 48, it will be seen that with this type of suspension system, the wheels are caused to move in substantially vertical planes as indicated by the dotted line positions 47a and 47b of the spindles in Fig. 1, there being slight inward lateral movement to compensate for spring flexure. The numerous advantages of systems of this nature are fully discussed in the previously referred patent and also in the copending application on spring mounting.

The supporting structure 14, in addition to serving as a mounting for the various spring hangers or perches, also is employed as a mounting for the steering arm generally indicated at 48. The steering arm and additional parts of the steering gear are shown and described more fully in our copending application on steering gear, Ser. No. 331,228, filed on even date herewith, but for the purpose of showing the manner in which the supporting structure 14 may be adapted for use as the steering gear mounting, as well as for carrying the springs, we will describe the steering gear generally at this time. It may be stated that the present steering gear is designed especially for use in spring suspension systems of the character shown, the various parts of the steering gear being such as to permit of the particular spring action had in this system.

The T-shaped steering element 50 embodies the horizontally extending front arm 50a, having an integral vertically offset and arcuate extension 50b on one side thereof; arm 50d, extending through and horizontally at right angles with the front arm 50a, the latter being held on arm 50b by means of the nut 52; and the vertical pin 50c integral with arm 50d. The latter extends horizontally from the vertical center of pin 50c. This assembly is mounted on the supporting structure arms 15 by means of the vertical bearings 53 and 53a, in which pin 50c is journaled, the bearings being bolted at 54 to the channel plate 55 which is secured to the inner faces of arms 15 by bolts 56. Thus it is seen that the T-shaped arm 50 is capable of horizontal swinging movement with pin 50c as a center, the supporting arms being cut-away as at 58 to allow for such swinging movement of the arm to the dotted line positions D and E.

Steering arm 50a is terminally connected to the steering knuckle arms 59 by means of tie-rods 60, the connections between these parts being made through ball and socket joints 61 and 61a. As clearly shown in Fig. 3, the arcuate arm extension 50b is vertically offset above the horizontal front arm 50a and is terminally connected to the drag link 63 by means of the ball joint 64, the drag link being actuated from the steering wheel shaft, not shown, in the usual manner. Arm 50b is vertically offset as shown to provide suitable clearance for the tie rod. One of the tie rods is omitted in the drawings for the purpose of showing the ball mounting 65 on each end of arm 50a, the complementary sockets which, together with the balls, comprise joints 61a, being mounted on the ends of the tie rods.

It will be seen that upon vertical movement of the wheels and wheel carriers 45, relative to the spring mounting, to the extent represented by dotted line spindle positions 47a and 47b, the ends of the springs, at the points 45a of connection with the wheel carriers, move in the arcs A, A' having their centers substantially on the vertical center line L—L' of the springs. Similarly the point 61, at which the steering knuckle arm is joined to the tie rods, has a path of travel conventionally represented by the arc B.

Upon movement of the steering arm 50, by the drag link, to the dotted line positions D and E, the steering knuckle arms and the spindles obviously assume respectively the positions 59d, 59e, and 47d, 47e. Therefore it is seen that since the arms 59 have vertical movement bodily and also horizontal turning movement about the wheel pivots 48a, the joints 61 and 61a between the tie rods and arms 59 and 50a, respectively, must be capable of accommodating the described movement of the parts. Inasmuch as the joints at 61 have vertical arcuate travel relative to the steering arm joints 61a, the steering arm 50 is mounted in a position such that the tie rods 60 normally are substantially horizontal. By using universal or ball-and-socket joints between the members of the steering gear, their relative movements take place without binding and undue wear at the joints that would cause "play" between the parts. It may be stated that in order to provide for smooth performance of the steering gear, the various parts are carefully proportioned and arranged, these features being explained in detail in the copending application on steering gear mentioned above.

We claim:

1. A mounting for connecting a horizontally extending spring to a spring supported frame, embodying a pair of spaced, axially alined perches adapted to take the spring at two longitudinally spaced points therealong, said perches each embodying a pair of vertically opposed interconnected blocks spaced respectively from the upper and lower surfaces of the spring, a pair of pads one between each of said blocks and the spring, the bearing surface of each pad being curved longitudinally of the spring and away from the spring on each side of its point of contact therewith, and the inner surfaces of the blocks engaging the pads being curved similarly to said bearing surfaces of the pads.

2. A mounting for connecting a horizontally extending spring to a spring supported frame, embodying a pair of spaced, axially alined perches adapted to take the spring at two longitudinally spaced points therealong, said perches embodying a pair of horizontally spaced bearing members engaging the spring, said members being curved longitudinally of the spring and away from the spring on each side of the points of contact therewith, and a buffer plate mounted on the spring between said perches and terminally bearing against the curved surfaces of said members, the ends of said buffer plate being curved away from the spring to conform substantially to the contour of said members.

3. In combination with a horizontally extending spring connected to a vehicle frame, a center clamp for said spring embodying a buffer plate extending along the spring between relatively stationary members mounted on the frame, said buffer plate being adapted to bear terminally against said members to prevent relative lateral movement of the spring, and to permit its flexing movement.

4. A mounting for connecting a horizontally extending spring to a spring supported frame, embodying a pair of spaced, axially alined perches adapted to take the spring at two longitudinally spaced points therealong, a spring clamp between said perches, said clamp embodying a buffer plate extending along the spring and bearing terminally against said perches.

5. A mounting for connecting a horizontally extending spring to a spring supported frame, embodying a pair of spaced, axially alined perches adapted to take the spring at two longitudinally spaced points therealong, a spring clamp between said perches, said clamp embodying a buffer plate extending along the spring and bearing terminally against said perches, the engagement of said buffer plate with the perches being such as to permit flexing movement of the spring and to prevent its lateral movement relative to the perches.

6. A mounting for connecting a horizontally extending spring to a spring supported frame, embodying a pair of spaced, axially alined perches adapted to take the spring at two longitudinally spaced points therealong, said perches embodying a pair of horizontally alined pads bearing against the spring, and a buffer plate secured to the spring between said perches and bearing terminally against said horizontally alined pads.

7. A mounting for connecting a horizontally extending spring to a spring supported frame, embodying a pair of spaced, axially alined perches adapted to take the spring at two longitudinally spaced points therealong, each of said perches embodying a pair of vertically opposed pads engaging the spring on its upper and lower surfaces, the bearing surface of each pad being curved longitudinally of the spring and away from the spring on each side of its point of contact therewith, and a buffer plate mounted on the spring between said perches and terminally bearing against the curved surfaces of horizontally opposed pads, the ends of said buffer plate being curved away from the spring to conform substantially to the contour of the pads.

8. A mounting for connecting vertically spaced pairs of parallel transverse springs to a substantially rectangular vehicle frame, embodying a pair of horizontally extending arms secured to one end of the frame at horizontally spaced points thereon, the arms being arranged substantially symmetrically with relation to the axis of the frame and extending laterally between said springs, and means for securing said springs to the upper and lower sides of the arms.

9. A mounting for connecting a transverse spring to a substantially rectangular vehicle frame, embodying a pair of horizontally extending arms secured to one end of the frame at horizontally spaced points thereon, the arms being arranged substantially symmetrically with relation to the axis of the frame and extending laterally across said spring, said perches each embodying a pair of vertically opposed blocks spaced respectively from the upper and lower surfaces of the spring and secured to one of said arms, and a yieldable pad between each of said blocks and the spring.

10. A mounting for connecting a pair of transverse and vertically alined springs to a substantially rectangular vehicle frame, embodying a pair of horizontally extending arms secured to one end of the frame at horizontally spaced points thereon, the arms being arranged substantially symmetrically with relation to the axis of the frame and extending laterally between said springs, and a pair of spring mountings secured to the top and bottom surfaces of each arm.

In witness that we claim the foregoing we have hereunto subscribed our names this 13th day of December, 1928.

OSCAR F. LUNDELIUS.
JOHN R. DILLON.